(No Model.)

B. T. HARRIS.
FEED BAG.

No. 409,838. Patented Aug. 27, 1889.

Witnesses:
J. Staib
Chas H Smith

Inventor:
Benjamin T. Harris
per Lemuel W. Serrell
Atty

UNITED STATES PATENT OFFICE.

BENJAMIN T. HARRIS, OF BROOKLYN, NEW YORK.

FEED-BAG.

SPECIFICATION forming part of Letters Patent No. 409,838, dated August 27, 1889.

Application filed August 4, 1888. Serial No. 281,938. (No model.)

*To all whom it may concern:*

Be it known that I, BENJAMIN T. HARRIS, of Brooklyn, in the county of Kings and State of New York, have invented an Improvement in Feed-Bags for Horses; and the following is declared to be a description of the same.

In most large cities truck and dray horses are fed during the day while standing in the streets, the feed being placed in a canvas bag that is hung over the head of the horse. When these bags are full of oats, the horse's mouth is often embedded in the oats and there is danger of the dust and oats getting up the nostrils of the horse and inconveniencing the same, as well as being liable to produce or lay the seeds of disease, and in these cases when most of the feed is eaten from the bag the horse in his efforts to get at his food tosses the bag around, spilling a good deal of the oats, and thus producing waste.

The object of my invention is to overcome these difficulties; and with that end in view my invention relates to a feed-bag that is attached to and supported by the collar of the horse independent of his head, so that the head of the horse in eating is free to be introduced into the bag to any depth to obtain the food, and to be removed from the same while eating, and the horse can reach his food as well at the bottom of the bag as at the top.

Figure 1:
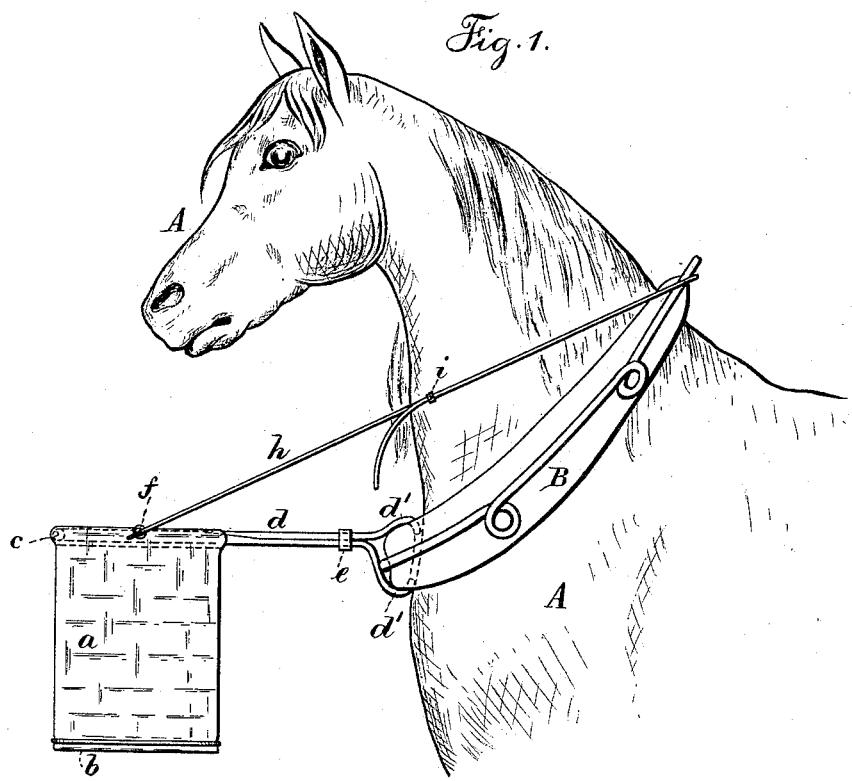
Figure 2:
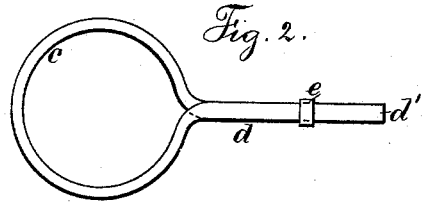

In the drawings, Figure 1 is an elevation showing the head and forward part of a horse and my improved feed-bag suspended from the collar. Fig. 2 is a plan of the rim of the bag and supporting-arms, and Fig. 3 is a view of a modified form of engaging ends.

A represents the head and forward part of the horse, and B a collar around the neck of the horse, upon which collar are the usual hames, and said collar and hames may be of any usual construction.

$a$ represents the feed-bag, which I prefer to make of canvas or other flexible material, and the same has a bottom portion at $b$, and is supported from a rim $c$, which rim encircles the top of the bag, and there are supporting-arms $d$ formed with or secured to the rim $c$, the ends of said arms at $d'$ being bent over into about the shape shown in Fig. 1, to grasp the top and bottom edges of the lower portion of the collar, and there is a sliding ring $e$ surrounding the arms $d$, and the same is moved along the arms $d$ toward the bent ends $d'$ to clamp the same together, and when said ring $e$ is moved toward the bag $a$ the bent ends $d'$ can be sprung apart to remove the bag and its arms from the collar, and upon each side of the rim $c$ there are the eyes $f$, from which eyes a strap $h$ passes around the top of the collar behind the upper end of the hames. I prefer to provide this strap with a buckle at $i$, so that the same may be drawn taut to assist the arms $d$ in supporting the bag when the same is filled with feed.

Figure 3:
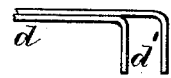

The modification shown in Fig. 3 is designed to dispense with the sliding ring $e$, and in this case the bent ends $d'$ are formed at right angles to the arms $d$, and are adapted to set over the upper edge at the lower end of the collar, one arm being inside the collar and one outside; but I do not consider this form as advantageous as that heretofore described.

My improved feed-bag is simple and efficient, is easily attached to or detached from the collar of the horse by which it is supported, and from said bag a horse can be fed without the liability of spilling or losing the feed and with much more comfort to the animal.

I claim as my invention—

1. The combination, with a feed-bag and a suspending device $h$, extending from the bag to the upper part of the collar, of the rim $c$ for the bag, having a projecting arm $d$ at one side thereof, with the two downwardly-projecting bent ends $d'$, one of which hooks above and behind the front portion of the collar and the other rests against the front of the collar, substantially as set forth.

2. The combination, with the bag $a$ and rim $c$, of the supporting-arms $d$, the bent engaging ends $d'$, formed upon the ends of said arms, the sliding ring $e$, the eyes $f$, and the strap $h$, substantially as and for the purposes set forth.

Signed by me this 1st day of August, 1888.

BENJ. T. HARRIS.

Witnesses:
   GEO. T. PINCKNEY,
   HAROLD SERRELL.